(12) United States Patent
Wang

(10) Patent No.: US 12,271,230 B2
(45) Date of Patent: Apr. 8, 2025

(54) DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Wenqiang Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 220 days.

(21) Appl. No.: 17/800,234

(22) PCT Filed: Jun. 29, 2022

(86) PCT No.: PCT/CN2022/102250
§ 371 (c)(1),
(2) Date: Aug. 17, 2022

(87) PCT Pub. No.: WO2023/231116
PCT Pub. Date: Dec. 7, 2023

(65) Prior Publication Data
US 2023/0393622 A1    Dec. 7, 2023

(51) Int. Cl.
*G06F 1/16* (2006.01)
(52) U.S. Cl.
CPC .......... *G06F 1/1641* (2013.01); *G06F 1/1652* (2013.01)
(58) Field of Classification Search
None
See application file for complete search history.

(56) References Cited

U.S. PATENT DOCUMENTS

2015/0049428 A1\* 2/2015 Lee ................ G06F 1/1652
                                                          361/679.27
2016/0209874 A1 7/2016 Choi et al.
(Continued)

FOREIGN PATENT DOCUMENTS

| CN | 110518039 A | 11/2019 |
| CN | 110767094 A | 2/2020 |

(Continued)

OTHER PUBLICATIONS

Chinese Office Action issued in corresponding Chinese Patent Application No. 202210617617.2 dated Oct. 12, 2023, pp. 1-8.
(Continued)

*Primary Examiner* — James Wu
*Assistant Examiner* — Christopher L Augustin
(74) *Attorney, Agent, or Firm* — Rivka Friedman

(57) ABSTRACT

A display device is provided. In the present invention, a first support structure is utilized to improve flatness of a modular laminated structure, and a second support structure is utilized to increase a radius of curvature of the modular laminated structure in a first bending area, which increases a continuity of radian of the modular laminated structure in the first bending area and ease a stress of the modular laminated structure in the first bending area. Therefore, a risk of peeling off film layers of the modular laminated structure in the first bending area and a risk of imprinting of the modular laminated structure in the first bending area are reduced.

19 Claims, 10 Drawing Sheets

(56) References Cited

U.S. PATENT DOCUMENTS

| | | | | |
|---|---|---|---|---|
| 2018/0013080 A1* | 1/2018 | Kim | .................. | H10K 50/844 |
| 2021/0352812 A1* | 11/2021 | Park | .................. | G06F 1/1652 |
| 2021/0397218 A1* | 12/2021 | Seo | .................. | G06F 1/1616 |
| 2022/0287189 A1* | 9/2022 | Kim | .................. | H05K 5/0017 |

FOREIGN PATENT DOCUMENTS

| | | |
|---|---|---|
| CN | 111415586 A | 7/2020 |
| CN | 112133725 A | 12/2020 |
| CN | 112509462 A | 3/2021 |
| CN | 113053238 A | 6/2021 |
| CN | 113284930 A | 8/2021 |
| CN | 113554943 A | 10/2021 |
| CN | 113724631 A | 11/2021 |
| CN | 113793553 A | 12/2021 |
| CN | 113793554 A | 12/2021 |
| CN | 113888986 A | 1/2022 |
| CN | 114078394 A | 2/2022 |
| CN | 114093272 A | 2/2022 |
| CN | 114203049 A | 3/2022 |
| CN | 114333589 A | 4/2022 |
| CN | 114446170 A | 5/2022 |
| CN | 216647717 U | 5/2022 |
| WO | 2021111619 A1 | 6/2021 |

OTHER PUBLICATIONS

International Search Report in International application No. PCT/CN2022/102250, mailed on Dec. 19, 2022.

Written Opinion of the International Search Authority in International application No. PCT/CN2022/102250, mailed 2 on Dec. 19, 2022.

Chinese Office Action issued in corresponding Chinese Patent Application No. 202210617617.2 dated Apr. 20, 2023, pp. 1-8.

* cited by examiner

DISPLAY DEVICE

FIELD OF INVENTION

The present application relates to a field of display technology, and particularly relates to a display device.

BACKGROUND OF INVENTION

Currently, once a foldable display device is launched, it has been favored by consumers. However, after the folding display device is folded for many times, a modular laminated structure is prone to form obvious creases and imprints. The problem of forming the creases and imprints has been one of main reasons hindering further growth of the folding display device market.

Technical Problem

The reasons that cause the creases and imprints in the modular laminated structure are complex, mainly including following reasons:

First, after module layers of the modular laminated structure have undergone multiple fatigue bending, accumulated microscopic deformation is formed in the module layers. When the number of bending reaches a certain number, an irreversible macroscopic deformation will be formed. Second, a recovery of an adhesive layer of the modular laminated structure is slower than that of the module layers during a process of folding and flattening, so it is easy to cause uneven thickness of the adhesive layer between the module layers in the bending area, resulting in appearance of creases and imprints on a surface of the modular laminated structure. Third, a folding hinge of the folding display device is improperly designed to cause the modular laminated structure cannot naturally complete the folding and flattening actions, and there is tension or extrusion between the middle frame and the modular laminated structure. When the number of bending times is accumulated to a certain extent, microscopic damage between the module layers of the modular laminated structure is likely to cause creases and imprints visible to naked eyes. More importantly, the smaller the bending radius of the folding display device is, the more serious the local deformation of the bending area will be. When a local strain exceeds a limited plastic strain value of the module layers, irreversible plastic deformation will be formed, which will gradually cause macroscopic creases and imprints.

Currently, the ideas for solving the problems of creases and imprints in modular laminated structure mainly focus on two aspects:

First, by increasing non-adhesive distance between the modular laminated structure in the bending area and the middle frame of the mobile phone, that is, the width of the bending area is to be lengthened, which is beneficial to release or reduce the stress or deformation generated during folding, but this method will reduce the battery accommodation space of the middle frame of the mobile phone. The longer the width of the bending area, the smaller the space for the battery in the frame of the mobile phone. Second, through the design of folding hinge, the modular laminated structure in the bending area forms a water drop shape when folded, thereby reducing the bending stress, and improving the local deformation of the modular laminated structure. However, the design of water drop-shaped hinge is complicated, and the crease and imprint can only be relieved locally, which is not significant for the improvement of the problem of crease and imprint.

SUMMARY OF INVENTION

The purpose of the present invention is to provide a display device, which can solve the problem that obvious folds and imprints are easily formed in the modular laminated structure after the currently folding display device is folded for many times.

In order to solve the above problems, the present invention provides a display device. The display device includes a modular laminated structure defined with two non-bending areas and a bending area between the two non-bending areas. The bending area is divided into two first bending areas and a second bending area between the two first bending areas, wherein the second bending area is defined with a bending center line. The modular laminated structure includes: a backplate; a flexible display panel disposed on a side of the backplate; and a support layer disposed on a side of the backplate away from the flexible display panel. The support layer includes: a first support structure disposed on the side of the backplate away from the flexible display panel and located in the two non-bending areas, the two first bending areas, and the second bending area; and two second support structures disposed on a side of the first support structure away from the flexible display panel, located in the two non-bending areas and the two first bending areas, and are axially symmetric about the bending center line, wherein at least one grooves are defined on a side of any of the two second support structures located in the two first bending areas away from the flexible display panel.

Further, an extending direction of any of the plurality of grooves is parallel to the bending center line of the bending area.

Further, a thickness of the first support structure is uniform, and wherein a thickness of a portion of any of the two second support structures between any two adjacent grooves is equal to a thickness of a portion of any of the two second support structures in the two non-bending areas.

Further, the thickness of the portion of any of the two second support structures in the two non-bending areas is greater than the thickness of the first support structure.

Further, the thickness of the first support structure ranges from 30 μm to 40 μm, and the thickness of the portion of any of the two second support structures in the two non-bending areas ranges from 100 μm to 150 μm.

Further, a ratio of a projection area of the plurality of grooves on the backplate to a projection area of any of the two second support structures on the backplate ranges from 0.2 to 0.5.

Further, intervals between any two adjacent grooves are equal.

Further, any two adjacent grooves have a same width.

Further, any two adjacent grooves have a same depth.

Further, depths of the plurality of grooves gradually increase from the two non-bending areas to the second bending area.

Further, the two second support structures are disposed outside the second bending area.

Further, the support layer further includes a first adhesive layer provided between the first support structure and the two second support structures, wherein a projection of the first adhesive layer on the backplate completely coincides with a projection of the two second support structures on the backplate.

Further, the modular laminated structure further includes: a polarizer disposed on a side of the flexible display panel away from the backplate; and a cover plate disposed on a side of the polarizer away from the backplate.

Further, the modular laminated structure further includes a buffer layer disposed between the backplate and the support layer.

Further, the display device further includes: two middle frames rotatably connected to each other and axially symmetrical about the bending center line; two support plates disposed corresponding to the two second support structures in the two non-bending areas and fixed between the two middle frames and the two second support structures; and a folding hinge, wherein two ends of the folding hinge are respectively rotatably connected to the two support plates.

Further, the folding hinge includes: a hinge support; a hinge transmission mechanism disposed in the hinge support; a hinge support cover fixed on a top surface of the hinge support, wherein the hinge transmission mechanism is disposed in a receiving cavity formed by the hinge support cover and the hinge support; and two support plates rotatably connected to two ends of the hinge support, respectively.

Further, when the display device is in a folded state, the two middle frames are attached to each other, portions of the modular laminated structure located in the two non-bending areas are parallel to each other, and portions of the modular laminated structure located in the two first bending areas and a portion of the modular laminated structure located in the second bending area form a water drop shape.

Further, when the display device is in the folded state, a radius of curvature of any of the portions of the modular laminated structure located in the two first bending areas is greater than a radius of curvature of the portion of the modular laminated structure located in the second bending area.

Advantages

The support layer of the present invention includes a first support structure and a second support structure. The flatness of the modular laminated structure is improved by the first support structure, and the shape of the modular laminated structure in the first bending area under the folded state is changed and optimized by the second support structure. This increases the radius of curvature of the modular laminated structure in the first bending area and increases the radian continuity of the modular laminated structure in the first bending area. Therefore, the modular laminated structure in the first bending area is prevented from having bent sharp corners, and the stress of the modular laminated structure in the first bending area is relieved. This reduces the risk of peeling off the film layers of the modular laminated structure in the first bending area, and reduces the risk of imprinting of the modular laminated structure in the first bending area.

DESCRIPTION OF DRAWINGS

In order to illustrate the technical solutions in the embodiments of the present application more clearly, the following briefly introduces the accompanying drawings that need to be used in the description of the embodiments. Obviously, the drawings in the following description are only some embodiments of the present application. For one skilled in the art, other drawings can also be obtained from these drawings without paying creative effort.

Figure 1:
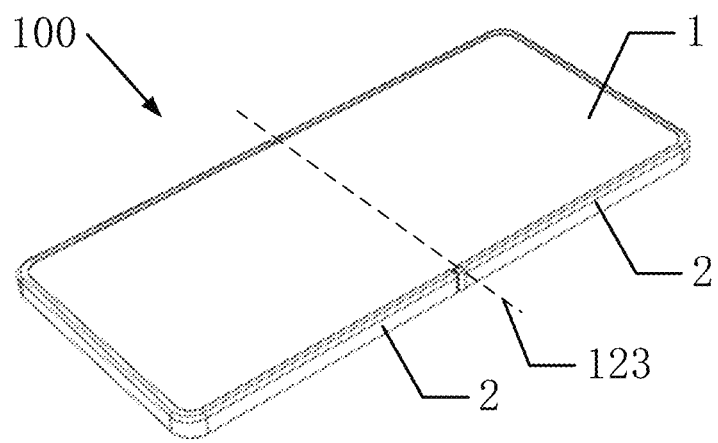
FIG. 1 is a schematic structural diagram of a display device of the present invention in an unfolded state.

Reference numerals: display device 100; modular laminated structure 1; middle frame 2; support plate 3; folding hinge 4; non-bending area 11; bending area 12; first bending area 121; second bending area 122; bending center line 123; backplate 101; flexible display panel 102; polarizer 103; cover plate 104; buffer layer 105; support layer 106; first adhesive layer 107; second adhesive layer 108; third adhesive layer 109; fourth adhesive layer 110; fifth adhesive layer 111; sixth adhesive layer 112; groove 113; first support structure 1061; second support structure 1062.

DETAILED DESCRIPTION OF PREFERRED EMBODIMENTS

The preferred embodiments of the present invention are described in detail with reference to the accompanying drawings to fully introduce the technical content of the present invention to one skilled in the art. Examples are given to prove that the present invention can be implemented, to make the technical content disclosed in the present invention clear, and to make it easier for one skilled in the art to understand how to implement the present invention. However, the present invention can be embodied in many different forms of embodiments, the protection scope of the present invention is not limited to the embodiments mentioned herein, and the description of the following embodiments is not intended to limit the scope of the present invention.

The directional terms mentioned in the present invention, such as "above", "below", "front", "back", "left", "right", "inside", "outside", "side", etc., are only the directions in the drawings. The directional terms used herein are used to explain and illustrate the present invention, rather than to limit the protection scope of the present invention.

In the drawings, structurally identical components are denoted by the same numerals, and structurally or functionally similar components are denoted by like numerals throughout. In addition, for ease of understanding and description, the size and thickness of each component denoted in the drawings are arbitrarily shown, and the present invention does not limit the size and thickness of each component.

Embodiment 1

As shown in FIG. 1, FIG. 2, FIG. 3 and FIG. 4, this embodiment provides a display device 100. Because organic light-emitting diodes (OLEDs) display device have advantages of thinness, high brightness, active light emission, low energy consumption, wide viewing angles, fast response times, flexibility, wide operating temperature range, low voltage demand, high power-saving efficiency, simple structure, low cost, almost infinitely high contrast, etc., in this embodiment, the flexible display device 100 is an OLED display device. The display device 100 includes a modular laminated structure 1, two middle frames 2, two support plates 3, and a folding hinge 4.

Figure 5:
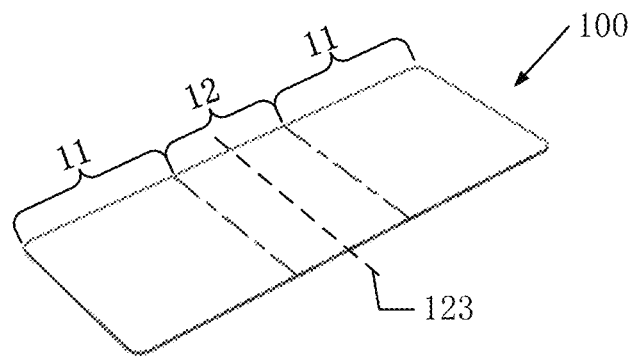
FIG. 5 is a three-dimensional schematic diagram of a modular laminated structure in an unfolded state.
Figure 6:
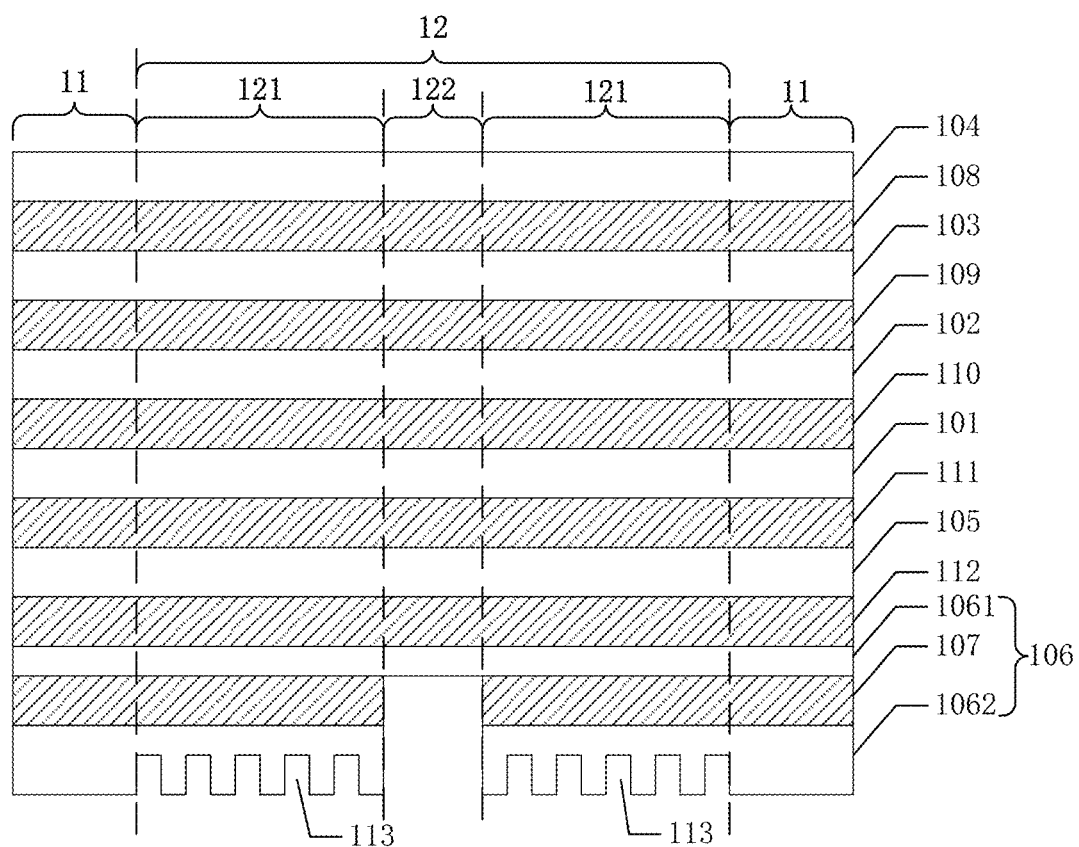
FIG. 6 is a schematic structural diagram of the modular laminated structure of Embodiment 1 in an unfolded state.

As shown in FIG. 5 and FIG. 6, modular laminated structure 1 includes two non-bending areas 11 and a bending area 12.

Wherein, the bending area 12 is defined between the two non-bending areas 11. The bending area 12 is divided into two first bending areas 121 and a second bending area 122 located between the two first bending areas 121. The second bending area 122 is defined with a bending center line 123.

As shown in FIG. 6, the modular laminated structure 1 includes a backplate 101, a flexible display panel 102, a polarizer 103, a cover plate 104, a buffer layer 105, a support layer 106, a first adhesive layer 107, a second adhesive layer 108, a third adhesive layer 109, a fourth adhesive layer 110, a fifth adhesive layer 111, and a sixth adhesive layer 112.

Wherein, the material of the backplate 101 includes one or more of polyimide, polycarbonate, polyethylene terephthalate, or polyethylene naphthalate. Therefore, the backplate 101 has a better bending performance.

The flexible display panel 102 is bonded to one side of the backplate 101 through the fourth adhesive layer 110. The flexible display panel 102 includes a film layer structure such as an array substrate, a light-emitting layer, and an encapsulation layer. Because the optically clear adhesive (OCA) has the advantages of high light transmittance and high bonding strength, in this embodiment, the material of the fourth adhesive layer 110 is optical adhesive.

The polarizer 103 is bonded to the side of the flexible display panel 102 away from the backplate 101 through the third adhesive layer 109. In this embodiment, the material of the third adhesive layer 109 is optical adhesive. The basic structure of the polarizer 103 includes two layers of triacetate cellulose (TAC) and polyvinyl alcohol (PVA) between the two layers of TAC. The PVA layer has a polarizing effect, but is easily hydrolyzed. In order to protect the physical properties of the polarizing film, a layer of (TAC) film with high light transmittance, high water resistance and certain mechanical strength is attached on both sides of the PVA layer. The polarizer 103 is a polymer film layer with high polarization optical properties and high temperature and high humidity resistance. It is used to reduce the reflection of natural light by the display device 100, so that the light emitted by the display device 100 is more like natural light, which can effectively reduce the visual fatigue of the viewer.

The cover plate 104 is bonded to the side of the polarizer 103 away from the backplate 101 through the second adhesive layer 108. In this embodiment, the material of the second adhesive layer 108 is optical adhesive. The material of the cover plate 104 can be a transparent organic polymer material such as polyethylene terephthalate, so that it has good optical properties and anti-wear properties. This enables the cover plate 104 to protect the flexible display panel 102 from external force damage while allowing the light of the flexible display panel 102 to pass through. The material of the cover plate 104 can also be ultra-thin glass, which has good optical properties and corrosion resistance, so that the cover plate 104 can isolate water and oxygen and protect the flexible display panel 102 from chemical corrosion.

The buffer layer 105 is bonded to the side of the backplate 101 away from the flexible display panel 102 through the fifth adhesive layer 111. In this embodiment, the material of the fifth adhesive layer 111 is optical adhesive. The material of the buffer layer 105 can be foam, thereby providing stress buffering and heat dissipation channels for the flexible display panel 102.

The support layer 106 is bonded to the side of the buffer layer 105 away from the flexible display panel 102 through the sixth adhesive layer 112. In this embodiment, the material of the sixth adhesive layer 112 is optical adhesive. The support layer 106 includes a first support structure 1061 and two second support structures 1062.

The first support structure 1061 is disposed on the side of the buffer layer 105 away from the flexible display panel 102, and is in the non-bending area 11, the first bending area 121, and the second bending area 122. The first support structure 1061 is mainly used to improve the overall flatness of the modular laminated structure 1.

The thickness of the first support structure 1061 is uniform. The thickness of the first support structure 1061 ranges from 30 µm to 40 µm. In this embodiment, the thickness of the first support structure 1061 is 35 µm.

The two second support structures 1062 are bonded to the side of the first support structure 1061 away from the flexible display panel 102 through the first adhesive layer 107, located in the non-bending area 11 and the first bending area 121, and is axially symmetrical with the bending center line 123.

The second support structure 1062 is disposed outside the second bending area 122. In other words, the second support structure 1062 is not disposed in the second bending area 122. The projection of the first adhesive layer 107 on the backplate 101 completely coincides with the projection of the second support structure 1062 on the backplate 101. In other words, the first adhesive layer 107 is not disposed in the second bending area 122. The second support structure 1062 of the first bending area 121 is utilized to change and optimize the shape of the modular laminated structure 1 in the first bending area 121 under the folded state, increase the radius of curvature of the modular laminated structure 1 in the first bending area 121, and improve the continuity of the curvature of the modular laminated structure 1 in the first bending area 121. Therefore, the appearance of the modular laminated structure 1 in the first bending area 121 is prevented from having bent sharp corners, the stress of the modular laminated structure 1 in the first bending area 121 is relieved, the risk of peeling off the film layers of the modular laminated structure 1 in the first bending area 121 is reduced, and the risk of imprinting of the modular laminated structure 1 in the first bending area 121 is reduced. The flatness of the entire surface of the modular laminated structure 1 is improved by using the second support structure 1062 in the non-bending area 11.

Figure 7:
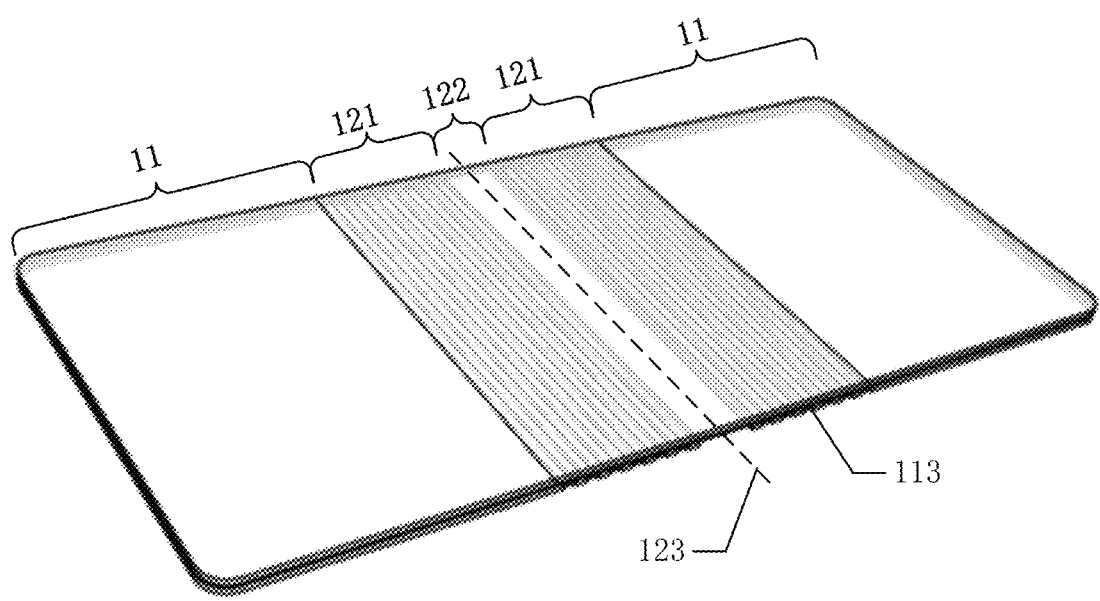
FIG. 7 is a schematic three-dimensional structure diagram of the support layer of the modular laminated structure of Embodiment 1 in an unfolded state.

As shown in FIG. 6 and FIG. 7, the modular laminated structure 1 is a flexible structure. When the display device 100 is folded, if grooves or through holes are defined on the surface of the second support structure 1062 on the side close to the flexible display panel 102, it is easy to produce imprints on the modular laminated structure 1. Therefore, in the present application, at least one groove 113 is defined on the surface of the second support structure 1062 located on the side of the first bending area 121 away from the flexible display panel 102. Specifically, the groove 113 may be formed by a half-etching process.

The extending direction of the groove 113 is parallel to the bending center line 123 of the bending area 12. The grooves 113 are used to reduce the bending rigidity of the second support structure 1062 in the first bending area 121 and improve the bendability of the second support structure 1062 in the first bending area 121. By adjusting the distance between two adjacent grooves 113, the width of the grooves 113, the depth of the grooves 113, the shape of the grooves 113 and other parameters to adjust the bent shape of the modular laminated structure 1 in the first bending area 121, increase the radius of curvature R1 of the modular laminated structure 1 in the first bending area 121, and increase the continuity of the curvature of the modular laminated structure 1 in the first bending area 121. Therefore, the appearance of the modular laminated structure 1 in the first bending area 121 is prevented from having bent sharp corners, the stress of the modular laminated structure 1 in the first bending area 121 is relieved, the risk of peeling off the film layers of the modular laminated structure 1 in the first bending area 121 is reduced, and the risk of imprinting of the modular laminated structure 1 in the first bending area 121 is reduced.

The ratio of a projection area of the grooves 113 on the backplate 101 to a projection area of the two second support structures 1062 on the backplate 101 ranges from 0.2 to 0.5. In this embodiment, the ratio of the projection area of the grooves 113 on the backplate 101 to the projection area of the second support structure 1062 on the backplate 101 is 0.3. Therefore, while improving the bendability of the second support structure 1062 in the first bending area 121 by using the groove 113, the support performance of the second support structure 1062 for the modular laminated structure 1 can be considered.

The thickness of the second support structure 1062 between any two adjacent grooves 113 is the same as the thickness of the second support structure 1062 in the non-bending area 11.

The thickness of the second support structure 1062 in the non-bending area 11 is greater than the thickness of the first support structure 1061. That is, the thickness of the second support structure 1062 between any two adjacent grooves 113 is greater than the thickness of the first support structure 1061. In this way, the modular laminated structure 1 can be better supported to prevent the stress of the modular laminated structure 1 in the bending area 12 from being transferred to the modular laminated structure 1 in the non-bending area 11 when the display device 100 is folded. The thickness of the second support structure 1062 located in the non-bending area 11 ranges from 100 µm to 150 µm. In this embodiment, the thickness of the second support structure 1062 in the non-bending area 11 is 120 µm.

In this embodiment, the distance between any two adjacent grooves 113 is equal. Any two adjacent grooves 113 have the same width. On the one hand, the preparation difficulty of the groove 113 can be reduced, on the other hand, the stress generated when the display device 100 is bent can be uniformly dispersed. In other embodiments, the distance between any two adjacent grooves 113 may be unequal. The widths of any two adjacent grooves 113 may also be unequal.

In this embodiment, any two adjacent grooves 113 have the same depth. On the one hand, the preparation difficulty of the groove 113 can be reduced, on the other hand, the stress of the modular laminated structure 1 in the first bending area 121 can be uniformly dispersed when the display device 100 is bent.

Figure 2:
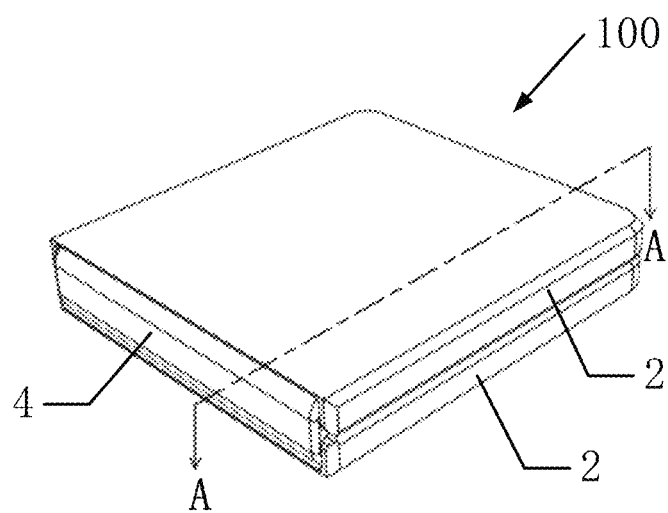
FIG. 2 is a schematic structural diagram of a display device of the present invention in a folded state.
Figure 3:
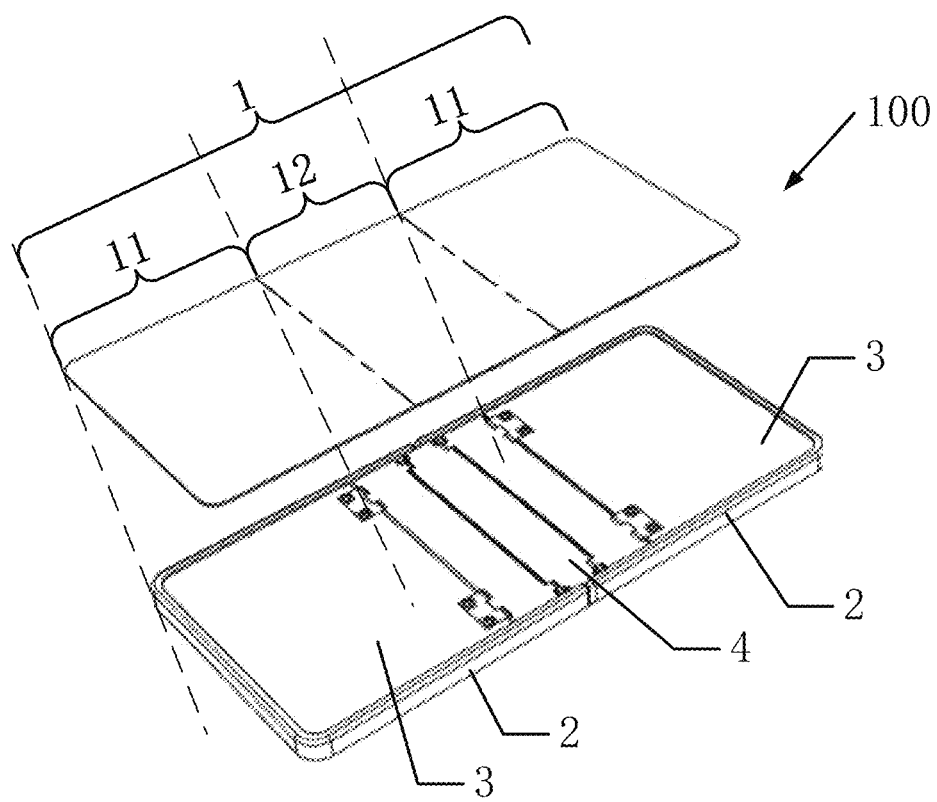
FIG. 3 is an exploded view of a display device of the present invention in an unfolded state.

As shown in FIG. 1, FIG. 2, and FIG. 3, the two middle frames 2 are rotatably connected to each other, and are axially symmetrical about the bending center line 123.

As shown in FIG. 1, FIG. 2, and FIG. 3, two support plates 3 are respectively disposed corresponding to the second support structures 1062 of the two non-bending areas 11, and it is fixed between the middle frames 2 and the second support structures 1062. The second support structure 1062 can be adhered to the support plate 3 through roll-on glue or grid glue.

As shown in FIG. 1, FIG. 2, and FIG. 3, both ends of the folding hinge 4 are rotatably connected to the two supporting plates 3 respectively.

Figure 8:
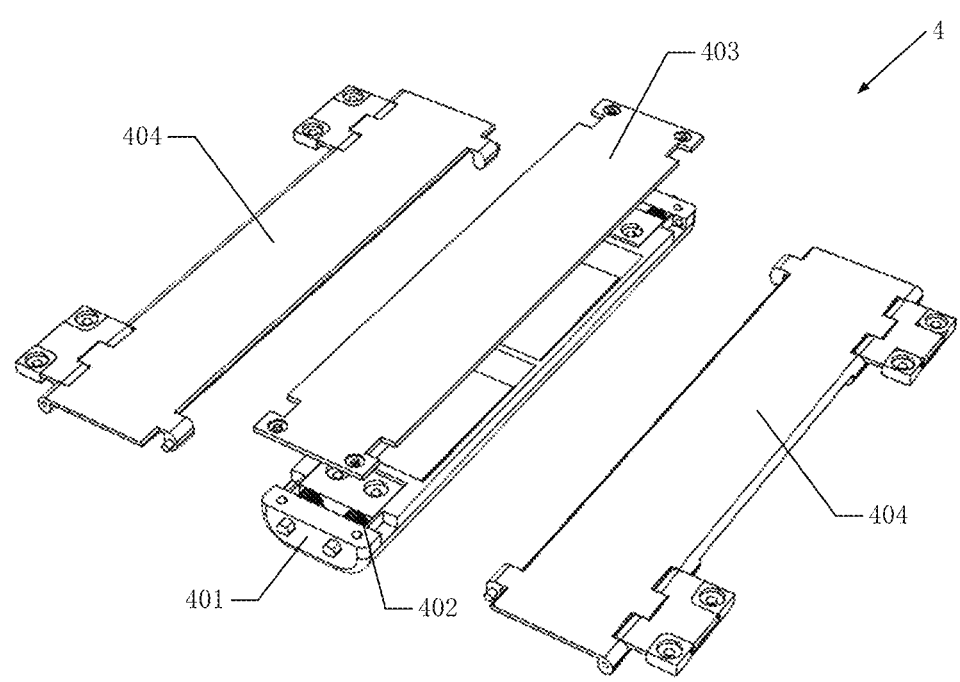
FIG. 8 is an exploded view of a folding hinge in an unfolded state.

As shown in FIG. 8, the folding hinge 4 includes: a hinge support 401, a hinge transmission mechanism 402, a hinge support cover 403, and two support plates 404.

The hinge transmission mechanism 402 is installed in the hinge support 401. The main function of the hinge transmission mechanism 402 is to play a two-way linkage function, so that the two middle frames 2 can be linked synchronously during the rotation process, thereby ensuring the smooth movement of the entire folding hinge 4.

The hinge support cover 403 is fixed on the top surface of the hinge support 401, and the hinge transmission mechanism 402 is installed in the receiving cavity formed by the hinge support cover 403 and the hinge support 401. The hinge support 401, the hinge transmission mechanism 402, and the hinge support cover 403 are arranged corresponding to the modular laminated structure 1 of the second bending area 122.

The two support plates 404 are rotatably connected to two ends of the hinge support 401, respectively. The two support plates 404 are respectively disposed corresponding to the modular laminated structures 1 of the two first bending areas 121. One ends of the two support plates 404 away from the hinge support 401 are respectively rotatably connected to the two support plates 3. When the display device 100 is folded, the support plate 404 can be rotated relative to the hinge support 401 by itself and through the linkage action of the hinge transmission mechanism 402, so that the support plate 404 can avoid or free up enough space in time to accommodate the modular laminated structure 1 that is deformed after folding to prevent active interference or hinder the natural deformation of the modular laminated structure 1. It can also be understood that the support plate 404 does not apply external force to the modular laminated structure 1 during the folding process, to prevent the display device layer inside the modular laminated structure 1 from breaking or failing.

Figure 4:
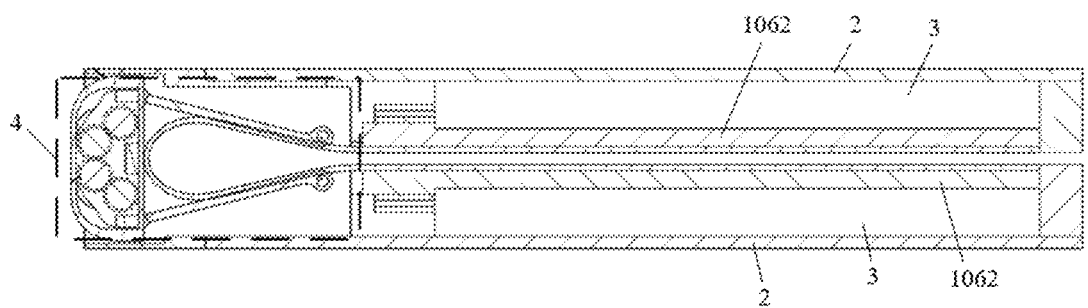
FIG. 4 is a cross-sectional view along a line A-A in FIG. 2.

As shown in FIG. 2 and FIG. 4, when the display device 100 is in a folded state, the two middle frames 2 are attached to each other. That is, after the display device 100 is folded, the two middle frames 2 are closed and tightly attached in a parallel state. After the two middle frames are closed, the gap between them is very small or even negligible. In this way, the entry of external dust, foreign objects, particles, etc. can be prevented, thereby achieving the function and effect of protecting the modular laminated structure 1.

Figure 9:
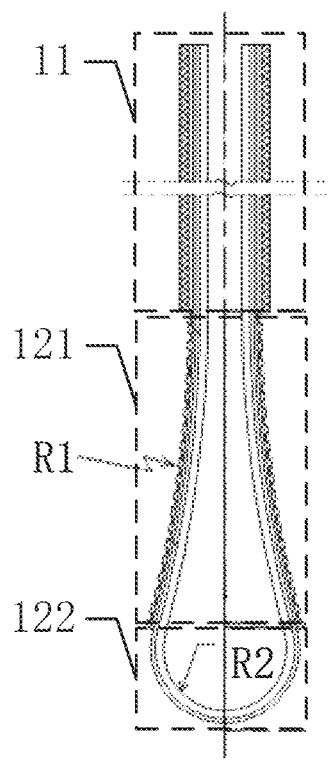
FIG. 9 is a schematic structural diagram of the modular laminated structure of Embodiment 1 in a folded state.

As shown in FIG. 4 and FIG. 9, the second support structure 1062 of the non-bending area 11 of the modular laminated structure 1 is bonded to the two support plates 3, and the support plates 3 are fixed to the middle frame 2. The support plate 3 is rotatably connected to the folding hinge 4, so when the display device 100 is folded, the middle frame 2 rotates, which drives the support plate 3 to rotate, and the support plate 3 drives the modular laminated structures 1 in the non-bending area 11 to approach each other and finally attach to each other in parallel. Since there is no adhesive provided between the modular laminated structure 1 of the first bending area 121 and the second bending area 122 and the folding hinge 4, when the display device 100 is folded, the modular laminated structure 1 of the first bending area 121 and the second bending area 122 can be freely deformed to form a curved shape. For example, in the shape of water droplets, the risk of creases in the modular laminated structure 1 in the bending area 12 can be reduced.

In this embodiment, when the display device 100 is in a folded state, the modular laminated structure 1 located in the first bending area 121 and the second bending area 122 is in the shape of a water drop. The radius of curvature of the modular laminated structure 1 in the first bending area 121 is R1, and the radius of curvature of the modular laminated structure 1 in the second bending area 122 is R2. The curvature radius R1 of the modular laminated structure 1 located in the first bending area 121 is greater than the curvature radius R2 of the modular laminated structure 1 located in the second bending area 122.

Figure 10:
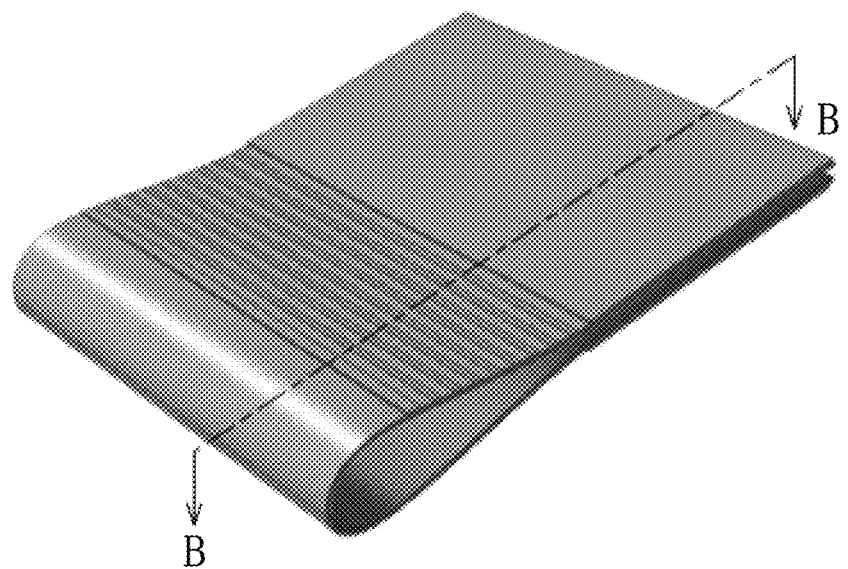
FIG. 10 is a three-dimensional diagram of mechanical simulation of the modular laminated structure of Embodiment 1 in a folded state.
Figure 11:
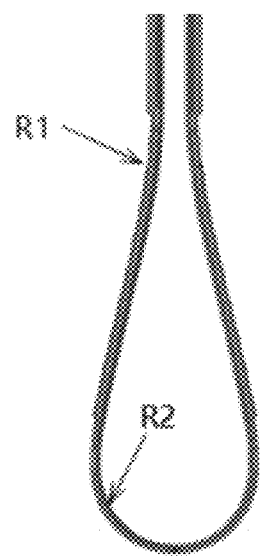
FIG. 11 is a cross-sectional view along a line B-B in FIG. 10.
Figure 12:
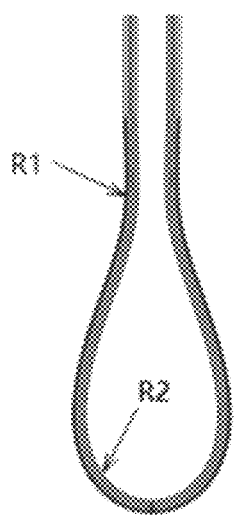
FIG. 12 is a mechanical simulation schematic diagram of a modular laminated structure in the prior art.

Please refer to FIG. 10, FIG. 11, and FIG. 12. A mechanical finite element software is used, parameters such as film layer design and material properties of the modular laminated structure 1 of the present invention are input, and the stress state and bending shape of the modular laminated structure 1 of the present invention after bending are calculated and simulated. The rationality of the design is compared and analyzed by extracting the index of the stress state of the film layers. The support layer 106 of the present invention adopts the double-layer structure of the first support structure 1061 and the second support structure 1062, which can change and optimize the shape of the modular laminated structure 1 in the first bending area 121 under the folded state, increase the radius of curvature of the modular laminated structure 1 in the first bending area 121, and improve the continuity of the curvature of the modular laminated structure 1 in the first bending area 121. Therefore, the appearance of the modular laminated structure 1 in the first bending area 121 is prevented from having bent sharp corners, the stress of the modular laminated structure 1 in the first bending area 121 is relieved, the risk of peeling off the film layers of the modular laminated structure 1 in the first bending area 121 is reduced, and the risk of imprinting of the modular laminated structure 1 in the first bending area 121 is reduced.

Figure 13:
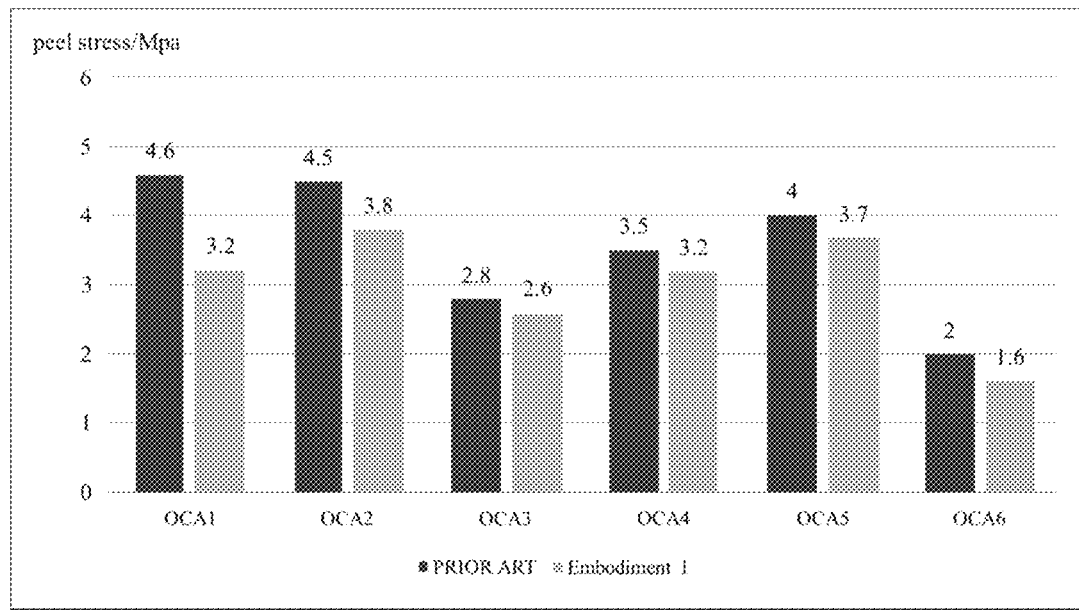
FIG. 13 is a comparison diagram of peeling stress of the optical adhesive of the display device in Embodiment 1 and an optical adhesive of a display device in the prior art under a folded state.

As shown in FIG. 13, in this embodiment, a first support structure 1061 and a second support structure 1062 are used to form a support layer 106 with a double-layer structure. Compared with the single-layer support layer in the prior art, when the display device 100 of this embodiment is bent, the stress value that causes the peeling of the first adhesive layer 107 (OCA6), the second adhesive layer 108 (OCA1), the third adhesive layer 109 (OCA2), the fourth adhesive layer 110 (OCA3), the fifth adhesive layer 111 (OCA4), and the sixth adhesive layer 112 (OCA5) is significantly reduced.

Figure 14:
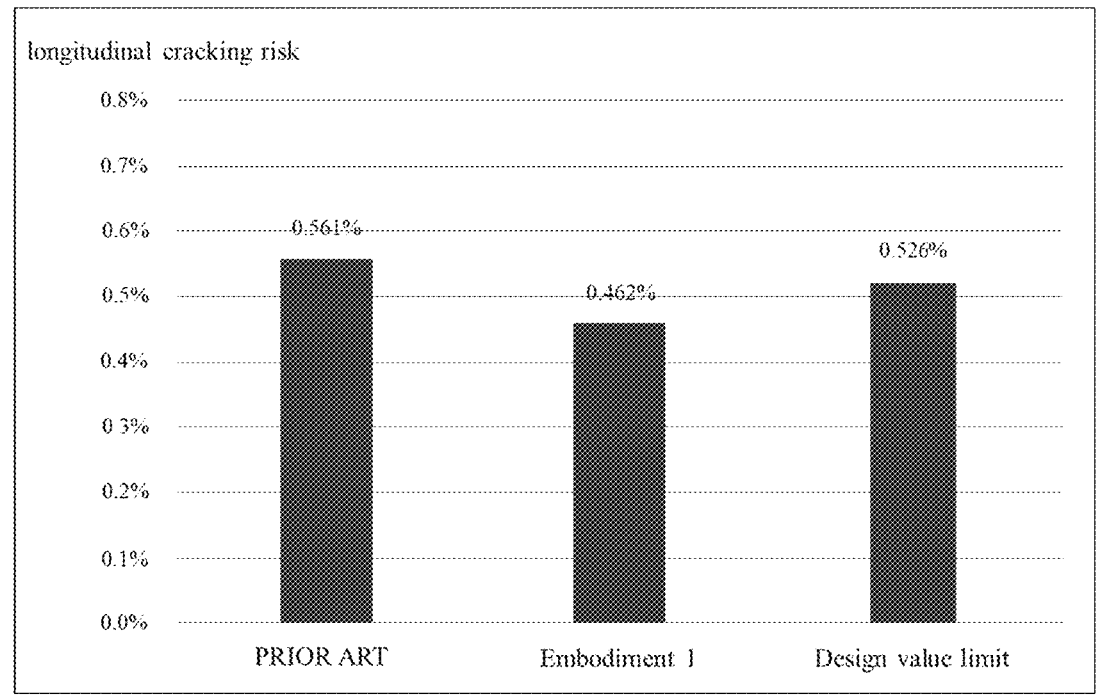
FIG. 14 is a comparison diagram of a risk of longitudinal cracks occurring in the flexible display panel of the modular laminated structure in Embodiment 1 and a risk of longitudinal cracks occurring in a flexible display panel of a modular laminated structure in the prior art.

As shown in FIG. 14, in this embodiment, the first support structure 1061 and the second support structure 1062 form the support layer 106 with a double-layer structure. In the prior art display device using a single-layer support layer, the risk value of longitudinal cracks in the flexible display panel 102 during bending is 0.561%. Compared with the prior art, when the display device 100 of this embodiment is bent, the risk of longitudinal cracks in the flexible display panel 102 is 0.462%, which is significantly reduced. Furthermore, when the display device 100 of this embodiment is bent, the risk of longitudinal cracks in the flexible display panel 102 is 0.462%, which is significantly less than the design limit of 0.526%. Thus, the risk of longitudinal cracks in the flexible display panel 102 when the display device 100 is bent can be reduced.

Embodiment 2

Figure 15:
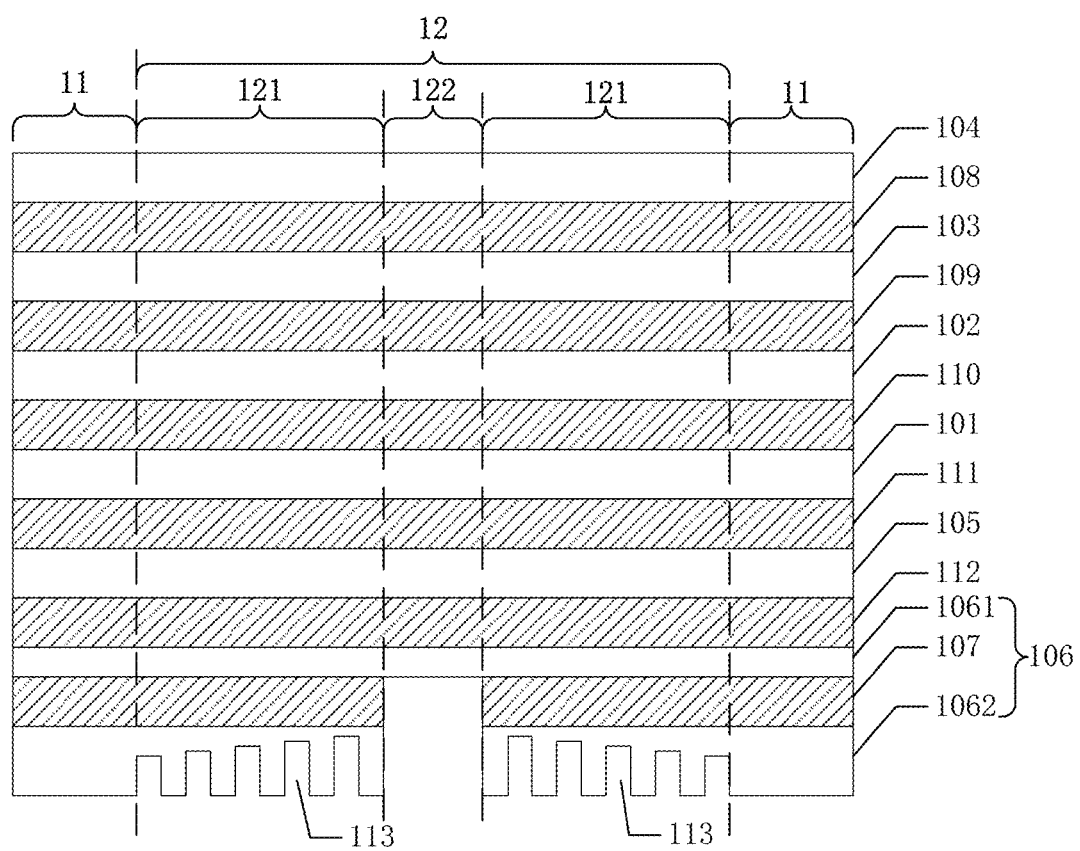
FIG. 15 is a schematic structural diagram of the modular laminated structure of Embodiment 2 in an unfolded state.

As shown in FIG. 15, this embodiment includes most of the technical features of Embodiment 1. The difference between this embodiment and Embodiment 1 is that the depths of the two adjacent grooves 113 in this embodiment gradually increase from the non-bending area 11 to the second bending area 122.

Thus, the thickness of the second support structure 1062 in the first bending area 121 is gradually reduced from the non-bending area 11 to the second bending area 122, so that the stiffness of the second support structure 1062 of the first bending area 121 gradually decreases from the non-bending area 11 to the second bending area 122. This results in a continuous gradient change of the bending modulus of the second support structure 1062 in the first bending area 121, which further changes and optimizes the shape of the modular laminated structure 1 in the first bending area 121 under the bending state, increases the radius of curvature R1 of the modular laminated structure 1 in the first bending area 121, and increases the continuity of the curvature of the modular laminated structure 1 in the first bending area 121. Therefore, the appearance of the modular laminated structure 1 in the first bending area 121 is prevented from having bent sharp corners, the stress of the modular laminated structure 1 in the first bending area 121 is relieved, the risk of peeling off the film layers of the modular laminated structure 1 in the first bending area 121 is reduced, and the risk of imprinting of the modular laminated structure 1 in the first bending area 121 is reduced.

Further, a display device provided by the present application has been introduced in detail above, and the principles and implementations of the present application are described with specific examples. The descriptions of the embodiments are only used to help understand the method of the present application and its core idea. In addition, for one skilled in the art, according to the idea of the present application, there may be changes in the specific embodiments and the scope of the present application. In conclusion, the content of this specification should not be construed as a limitation on the present application.

What is claimed is:

1. A display device, comprising a module stack defined with two non-bending areas and a bending area located between the two non-bending areas, wherein the bending area comprises two first bending areas and a second bending area located between the two first bending areas, wherein a bending center line is defined in the second bending area;

wherein the module stack comprises:

a backplate;

a flexible display panel disposed on a side of the backplate; and a support layer disposed on a side of the backplate away from the flexible display panel;

wherein the support layer comprises:

a first support structure disposed on the side of the backplate away from the flexible display panel and located in the two non-bending areas, the two first bending areas, and the second bending area, wherein a thickness of the first support structure is uniform and no groove is defined in the first support structure;

two second support structures disposed on a side of the first support structure away from the flexible display panel, located in the two non-bending areas and the two first bending areas, and are axially symmetric about the bending center line, wherein single or a plurality of grooves are defined on a side of any of the two second support structures located in the two first bending areas away from the flexible display panel; and wherein the thickness of the portion of any of the two second support structures in the two non-bending areas is greater than the thickness of the first support structure and the thickness of the second support structure between any two adjacent grooves is greater than the thickness of the first support structure.

2. The display device of claim 1, wherein an extending direction of any of the plurality of grooves is parallel to the bending center line of the bending area.

3. The display device of claim 1, wherein a thickness of a portion of any of the two second support structures between any two adjacent grooves is equal to a thickness of a portion of any of the two second support structures in the two non-bending areas.

4. The display device of claim 1, wherein the thickness of the first support structure ranges from 30 μm to 40 μm.

5. The display device of claim 4, wherein the thickness of the portion of any of the two second support structures in the two non-bending areas ranges from 100 μm to 150 μm.

6. The display device of claim 1, wherein a ratio of a projection area of the plurality of grooves on the backplate to a projection area of any of the two second support structures on the backplate ranges from 0.2 to 0.5.

7. The display device of claim 1, wherein intervals between any two adjacent grooves are equal.

8. The display device of claim 1, wherein any two adjacent grooves have a same width.

9. The display device of claim 1, wherein any two adjacent grooves have a same depth.

10. The display device of claim 1, wherein depths of the plurality of grooves gradually increase from the two non-bending areas to the second bending area.

11. The display device of claim 1, wherein the two second support structures are disposed outside the second bending area.

12. The display device of claim 10, wherein the support layer further comprises a first adhesive layer provided between the first support structure and the two second support structures.

13. The display device of claim 12, wherein a projection of the first adhesive layer on the backplate completely coincides with a projection of the two second support structures on the backplate.

14. The display device of claim 1, wherein the module stack further comprises:

a polarizer disposed on a side of the flexible display panel away from the backplate; and a cover plate disposed on a side of the polarizer away from the backplate.

15. The display device of claim 1, wherein the module stack further comprises:

a buffer layer disposed between the backplate and the support layer.

16. The display device of claim 1, further comprising:

two middle frames rotatably connected to each other and axially symmetrical about the bending center line;

two support plates disposed corresponding to the two second support structures in the two non-bending areas and fixed between the two middle frames and the two second support structures; and a folding hinge, wherein two ends of the folding hinge are respectively rotatably connected to the two support plates.

17. The display device of claim 16, wherein the folding hinge comprises:

a hinge support;

a hinge transmission mechanism disposed in the hinge support;

a hinge support cover fixed on a top surface of the hinge support, wherein the hinge transmission mechanism is disposed in a receiving cavity formed by the hinge support cover and the hinge support; and two support plates rotatably connected to two ends of the hinge support, respectively.

18. The display device of claim 16, wherein when the display device is in a folded state, the two middle frames are attached to each other, portions of the module stack located in the two non-bending areas are parallel to each other, and portions of the module stack located in the two first bending areas and a portion of the module stack located in the second bending area form a water drop shape.

19. The display device of claim 16, wherein when the display device is in the folded state, a radius of curvature of any of the portions of the module stack located in the two first bending areas is greater than a radius of curvature of the portion of the module stack located in the second bending area.

* * * * *